United States Patent
Nguyen et al.

(10) Patent No.: US 11,962,417 B2
(45) Date of Patent: Apr. 16, 2024

(54) FEEDBACK ADAPTATION FOR V2X COMMUNICATION

(71) Applicant: QUALCOMM Incorporated, San Diego, CA (US)

(72) Inventors: Tien Viet Nguyen, Bridgewater, NJ (US); Kapil Gulati, Hillsborough, NJ (US); Arjun Bharadwaj, Cupertino, CA (US); Sudhir Kumar Baghel, Hillsborough, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 6 days.

(21) Appl. No.: 15/930,156

(22) Filed: May 12, 2020

(65) Prior Publication Data

US 2020/0366422 A1 Nov. 19, 2020

Related U.S. Application Data

(60) Provisional application No. 62/847,180, filed on May 13, 2019.

(51) Int. Cl.
*H04L 1/1812* (2023.01)
*H04B 17/318* (2015.01)
(Continued)

(52) U.S. Cl.
CPC ........ *H04L 1/1819* (2013.01); *H04B 17/318* (2015.01); *H04W 4/025* (2013.01); *H04W 4/40* (2018.02); *H04W 92/18* (2013.01)

(58) Field of Classification Search
CPC ....... H04W 92/16; H04W 92/18; H04W 4/40; H04W 4/46; H04W 4/02; H04W 4/025;
(Continued)

(56) References Cited

U.S. PATENT DOCUMENTS

2017/0127320 A1   5/2017   Mok et al.
2017/0332390 A1   11/2017  Li et al.
(Continued)

FOREIGN PATENT DOCUMENTS

| CN | 107439036 A | 12/2017 |
| CN | 108028743 A | 5/2018 |
| KR | 20160108235 A | 9/2016 |

OTHER PUBLICATIONS

International Search Report and Written Opinion—PCT/US2020/032660—ISAEPO—dated Sep. 8, 2020.
(Continued)

*Primary Examiner* — Peter Chen
(74) *Attorney, Agent, or Firm* — Harrity & Harrity, LLP

(57) ABSTRACT

Various aspects of the present disclosure generally relate to wireless communication. In some aspects, a user equipment (UE) may perform at least one transmission of a communication, wherein the at least one transmission includes information indicating a feedback parameter for feedback regarding the at least one transmission, wherein the feedback parameter is a function of a control exclusion parameter of the UE. The UE may retransmit the communication when the feedback indicates that the at least one transmission was not received by a recipient device within the feedback parameter. Numerous other aspects are provided.

30 Claims, 7 Drawing Sheets

(51) Int. Cl.
*H04W 4/02* (2018.01)
*H04W 4/40* (2018.01)
*H04W 92/18* (2009.01)

(58) Field of Classification Search
CPC ....... H04W 4/027; H04W 4/029; H04W 4/70; H04W 24/10; H04W 76/14; H04W 72/02; H04W 72/0406; H04W 28/26; H04L 1/18; H04L 1/1812; H04L 1/1819; H04L 1/1825; H04L 1/1829; H04L 1/1854; H04L 1/1858; H04L 1/1864; H04L 1/1867; H04L 1/1887; H04L 1/1896; H04B 17/309; H04B 17/318; H04B 17/24; H04B 17/27

See application file for complete search history.

(56) References Cited

U.S. PATENT DOCUMENTS

| | | |
|---|---|---|
| 2019/0044667 A1 | 2/2019 | Guo et al. |
| 2019/0104525 A1 | 4/2019 | Santhanam et al. |
| 2020/0029245 A1* | 1/2020 | Khoryaev ......... H04W 72/0486 |
| 2020/0178039 A1* | 6/2020 | Lee ....................... H04L 1/1819 |
| 2020/0366421 A1* | 11/2020 | Tang ..................... H04L 1/1867 |
| 2022/0070844 A1* | 3/2022 | Lee ....................... H04W 92/18 |

OTHER PUBLICATIONS

Qualcomm Incorporated: "Sidelink Resource Allocation Mechanism for NR V2X", 3GPP Draft, 3GPP TSG RAN WG1 Meeting #97, R1-1907271_Sidelink Resource Allocation Mechanism for NR V2X, 3rd Generation Partnership Project (3GPP), Mobile Competence Centre, 650, Route Des Lucioles, F-06921 Sophia-Antipolis Cedex, vol. RAN WG1, No. Reno, USA, May 13, 2019-May 17, 2019 May 4, 2019 (May 4, 2019), XP051709294, 16 Pages, Retrieved from the Internet: URL:http://www.3gpp.org/ftp/tsg%5Fran/WG1%5FRL1/TSGR1%5F97/Docs/R1%2D1907271%2Ezip [retrieved on May 4, 2019], section 5, section 4.

* cited by examiner

FEEDBACK ADAPTATION FOR V2X COMMUNICATION

CROSS-REFERENCE TO RELATED APPLICATION

This Patent Application claims priority to U.S. Provisional Patent Application No. 62/847,180, filed on May 13, 2019, entitled "FEEDBACK ADAPTATION FOR V2X COMMUNICATION," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for feedback adaptation for vehicle-to-anything (V2X) communication.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include performing at least one transmission of a communication, wherein the at least one transmission includes information indicating a feedback parameter for feedback regarding the at least one transmission, wherein the feedback parameter is a function of a control exclusion parameter of the UE; and retransmitting the communication when the feedback indicates that the at least one transmission was not received by a recipient device within the feedback parameter.

In some aspects, a UE for wireless communication may include memory and one or more processors operatively coupled to the memory. The memory and the one or more processors may be configured to perform at least one transmission of a communication, wherein the at least one transmission includes information indicating a feedback parameter for feedback regarding the at least one transmission, wherein the feedback parameter is a function of a control exclusion parameter of the UE; and retransmit the communication when the feedback indicates that the at least one transmission was not received by a recipient device within the feedback parameter.

In some aspects, a non-transitory computer-readable medium may store one or more instructions for wireless communication. The one or more instructions, when executed by one or more processors of a UE, may cause the one or more processors to: perform at least one transmission of a communication, wherein the at least one transmission includes information indicating a feedback parameter for feedback regarding the at least one transmission, wherein the feedback parameter is a function of a control exclusion parameter of the UE; and retransmit the communication when the feedback indicates that the at least one transmission was not received by a recipient device within the feedback parameter.

In some aspects, an apparatus for wireless communication may include means for performing at least one transmission of a communication, wherein the at least one transmission includes information indicating a feedback parameter for feedback regarding the at least one transmission, wherein the feedback parameter is a function of a control exclusion parameter of the apparatus; and means for retransmitting the communication when the feedback indicates that the at least one transmission was not received by a recipient device within the feedback parameter.

Aspects generally include a method, apparatus, system, computer program product, non-transitory computer-readable medium, user equipment, base station, wireless communication device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
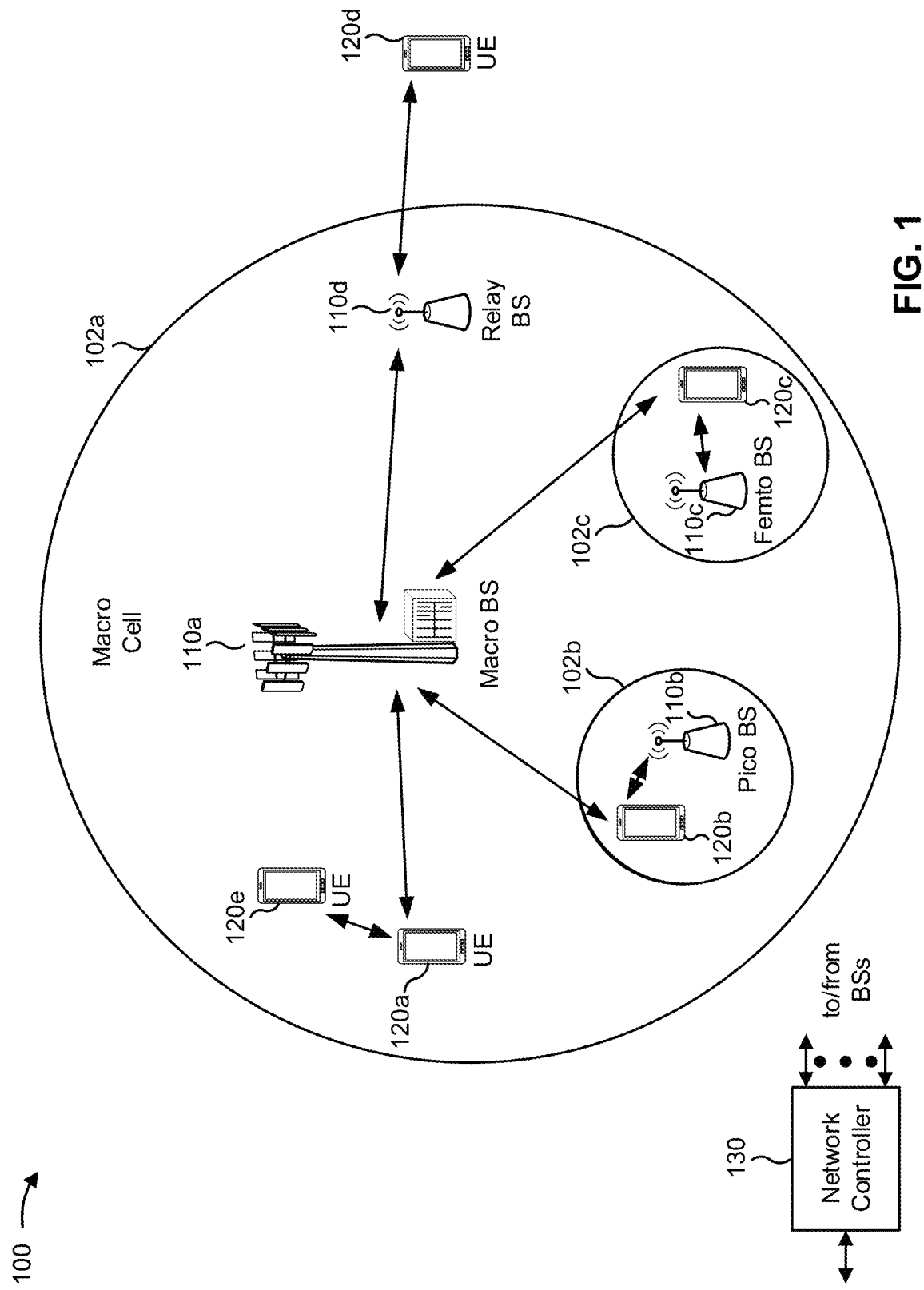
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110*a*, BS 110*b*, BS 110*c*, and BS 110*d*) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. ABS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, a road-side unit, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
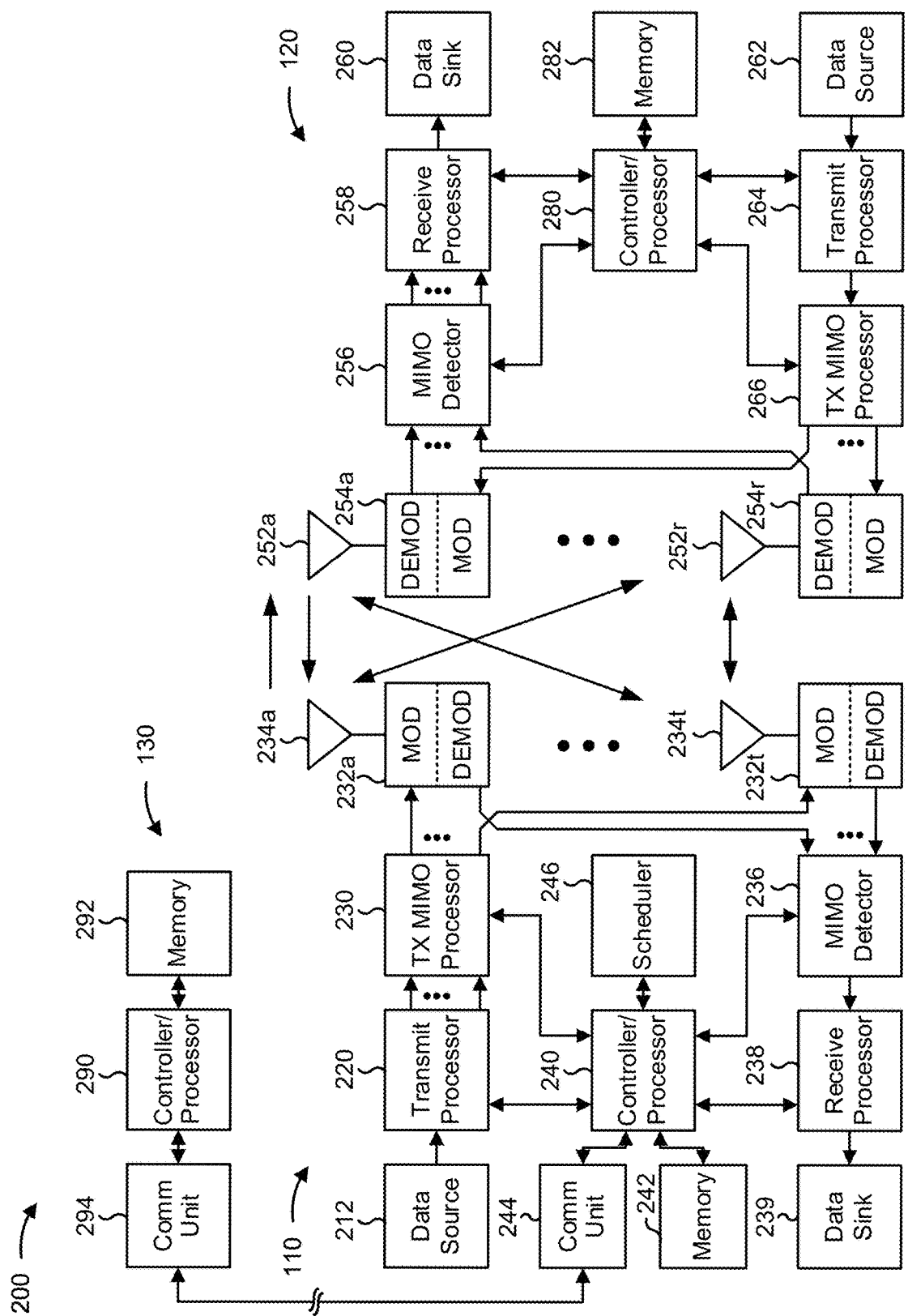
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with feedback adaptation for V2X communication, as described in more detail elsewhere herein. For example, controller/processor 240 of base station 110, controller/processor 280 of UE 120, and/or any other component(s) of FIG. 2 may perform or direct operations of, for example, process 400 of FIG. 4 and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for performing at least one transmission of a communication, wherein the at least one transmission includes information indicating a feedback parameter for feedback regarding the at least one transmission, wherein the feedback parameter is a function of a control exclusion parameter of the UE; means for retransmitting the communication when the feedback indicates that the at least one transmission was not received by a recipient device within the feedback parameter; and/or the like. In some aspects, such means may include one or more components of UE 120 described in connection with FIG. 2.

As indicated above, FIG. 2 is provided as an example. Other examples may differ from what is described with regard to FIG. 2.

A UE may use sidelink communications to communicate with other UEs without the intervention of a centralized scheduling entity. This may be useful in certain types of deployments, such as vehicle-to-anything (V2X) deployments. UEs (e.g., UEs associated with cars, user devices, road-side units, and/or the like) in a V2X deployment may communicate with each other regarding various actions, scenarios, and/or the like. In many cases, different communications may be associated with different desired ranges, different priority levels, different delay budgets, and/or the like. For example, a signal indicating that a vehicle associated with a UE is to take evasive action may be associated with a high priority level and/or a low delay budget.

One mechanism to ensure that traffic requirements are satisfied is the reservation mechanism. By reserving a resource, the UE may secure the resource for a future transmission without worry of interference with other UEs. For example, a UE may respect resource reservations based at least in part on a control exclusion (CE) zone. When the UE is within a CE zone of a UE that reserved a resource, the UE may respect the reservation. Thus, the CE zone may be used to control resource crowding, interference, and congestion.

Another mechanism to ensure high reliability without over-consuming network resources is the feedback mechanism. For example, a UE may transmit a communication. Recipient devices within range of the communication may transmit an acknowledgment (ACK) or a negative ACK (NACK) to indicate whether the communication was successfully received. In the case of NR V2X, the feedback mechanism may use a feedback parameter that indicates whether the recipient device is within range and, therefore, whether the recipient device should transmit feedback. When the UE (e.g., the transmitter device) receives at least one NACK from a recipient device, the UE may perform one or more retransmissions of the communication. In some cases, the feedback parameter may match a range requirement of the communication.

In some cases, the CE zone range may be shorter than the feedback parameter. For example, the UE may adapt the CE zone range to a shorter value, or the CE zone may be configured to be shorter than the feedback parameter. This may cause unnecessary retransmissions on the part of the UE. For example, since UEs outside of the CE zone may not respect reservations of the UE, and since the UE transmits feedback parameter information indicating that the UEs outside of the CE zone and within the feedback parameter are to transmit feedback, the UE may receive NACKs originating from UEs outside of the CE zone (that do not respect the UE's reservation) and inside of the feedback parameter (and are thus compelled to provide feedback). This may cause the UE to retransmit traffic at an elevated rate, thereby congesting sidelink resources of the network.

Some techniques and apparatuses described herein provide adaptation of the feedback parameter based at least in part on a CE parameter of the UE. For example, some techniques and apparatuses described herein provide a feedback parameter that is shorter or less inclusive than a CE zone defined by the CE parameter of the UE. A coefficient used to determine the feedback parameter may be a configurable parameter, or may be based at least in part on various characteristics of the UE, described elsewhere herein. By adapting the feedback parameter in view of the CE parameter, the likelihood of feedback originating from UEs that are outside of the CE zone is reduced, thereby improving network efficiency and reducing the incidence of frivolous retransmission by the UE.

Figure 3:
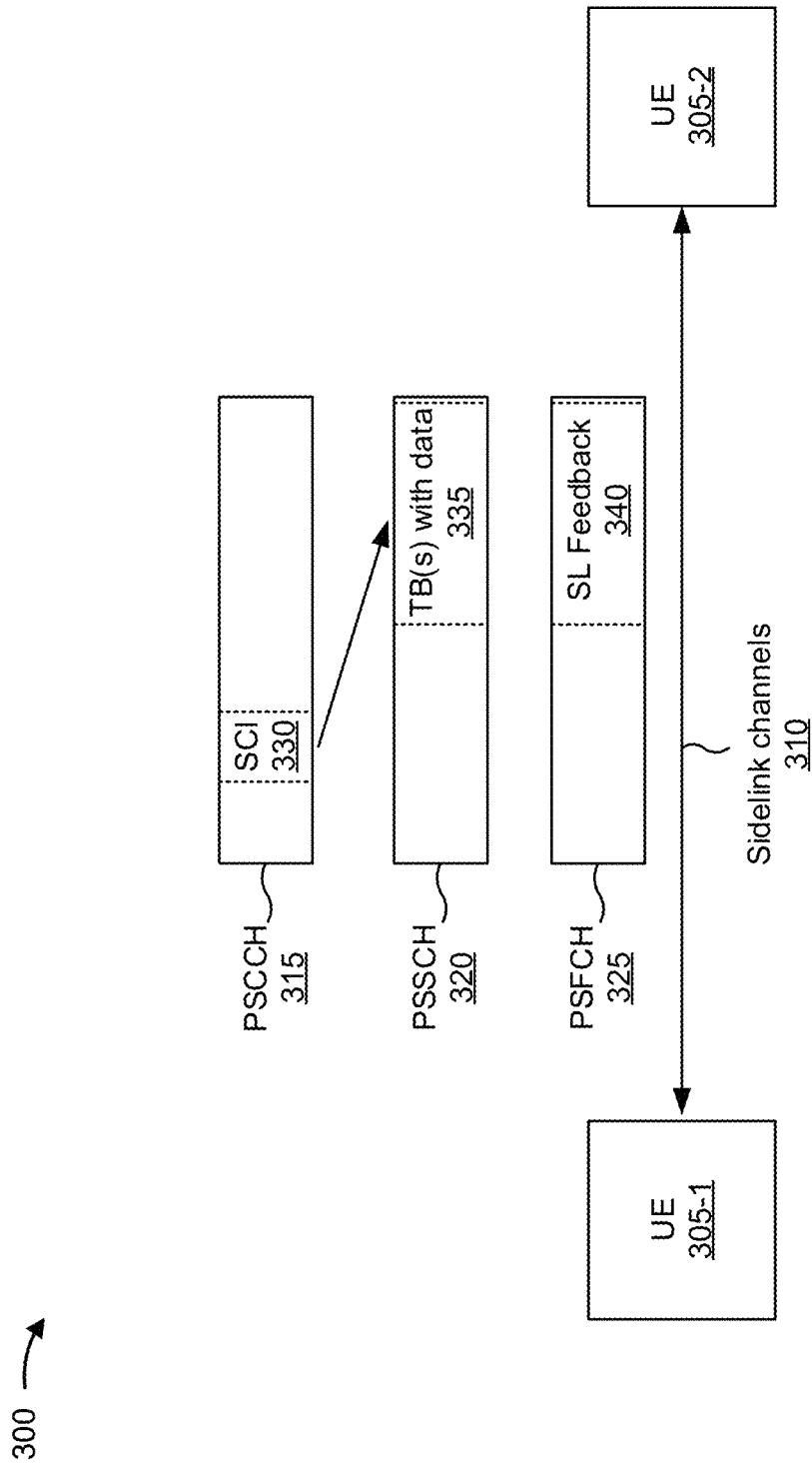
FIG. 3 is a diagram illustrating an example of sidelink communications, in accordance with various aspects of the present disclosure.

FIG. 3 is a diagram illustrating an example 300 of sidelink communications, in accordance with various aspects of the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, V2P communications, and/or the like), mesh networking, and/or the like. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, symbols, and/or the like) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, spatial resources, and/or the like) where a transport block (TB) 335 may be carried on the PSSCH 320. The TB 335 may include data. The PSFCH 325 may be used to communicate sidelink feedback 340, such as hybrid automatic repeat request (HARD) feedback (e.g., acknowledgement or negative acknowledgement (ACK/NACK) information), transmit power control (TPC), a scheduling request (SR), and/or the like.

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a transmission mode where resource selection and/or scheduling is performed by the UE 305 (e.g., rather than a base station 110). In some aspects, the UE 305 may perform resource selection and/or scheduling by sensing channel availability for transmissions. For example, the UE 305 may measure a received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter) associated with various sidelink channels, may measure a reference signal received quality (RSRQ) parameter (e.g., a PSSCH-RSRQ parameter) associated with various sidelink channels, and/or the like, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources, channel parameters, and/or the like. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, a modulation and coding scheme (MCS) to be used for the upcoming sidelink transmission, and/or the like. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As indicated above, FIG. 3 is provided as an example. Other examples may differ from what is described with respect to FIG. 3.

Figure 4:
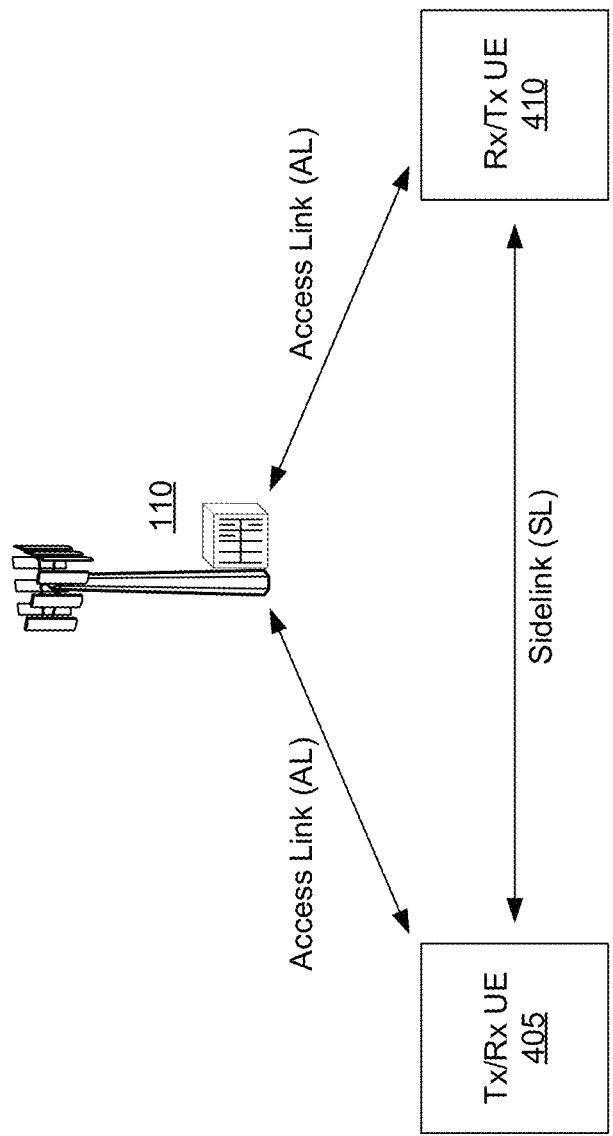
FIG. 4 is a diagram illustrating an example of sidelink communications and access link communications, in accordance with various aspects of the present disclosure.

FIG. 4 is a diagram illustrating an example 400 of sidelink communications and access link communications, in accordance with various aspects of the present disclosure.

As shown in FIG. 4, a transmitter (Tx) UE 405 and a receiver (Rx) UE 410 may communicate with one another via a sidelink, as described above in connection with FIG. 3. As further shown, in some sidelink modes, a base station 110 may communicate with the Tx UE 405 via a first access link. Additionally, or alternatively, in some sidelink modes, the base station 110 may communicate with the Rx UE 410 via a second access link. The Tx UE 405 and/or the Rx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As indicated above, FIG. 4 is provided as an example. Other examples may differ from what is described with respect to FIG. 4.

Figure 5:
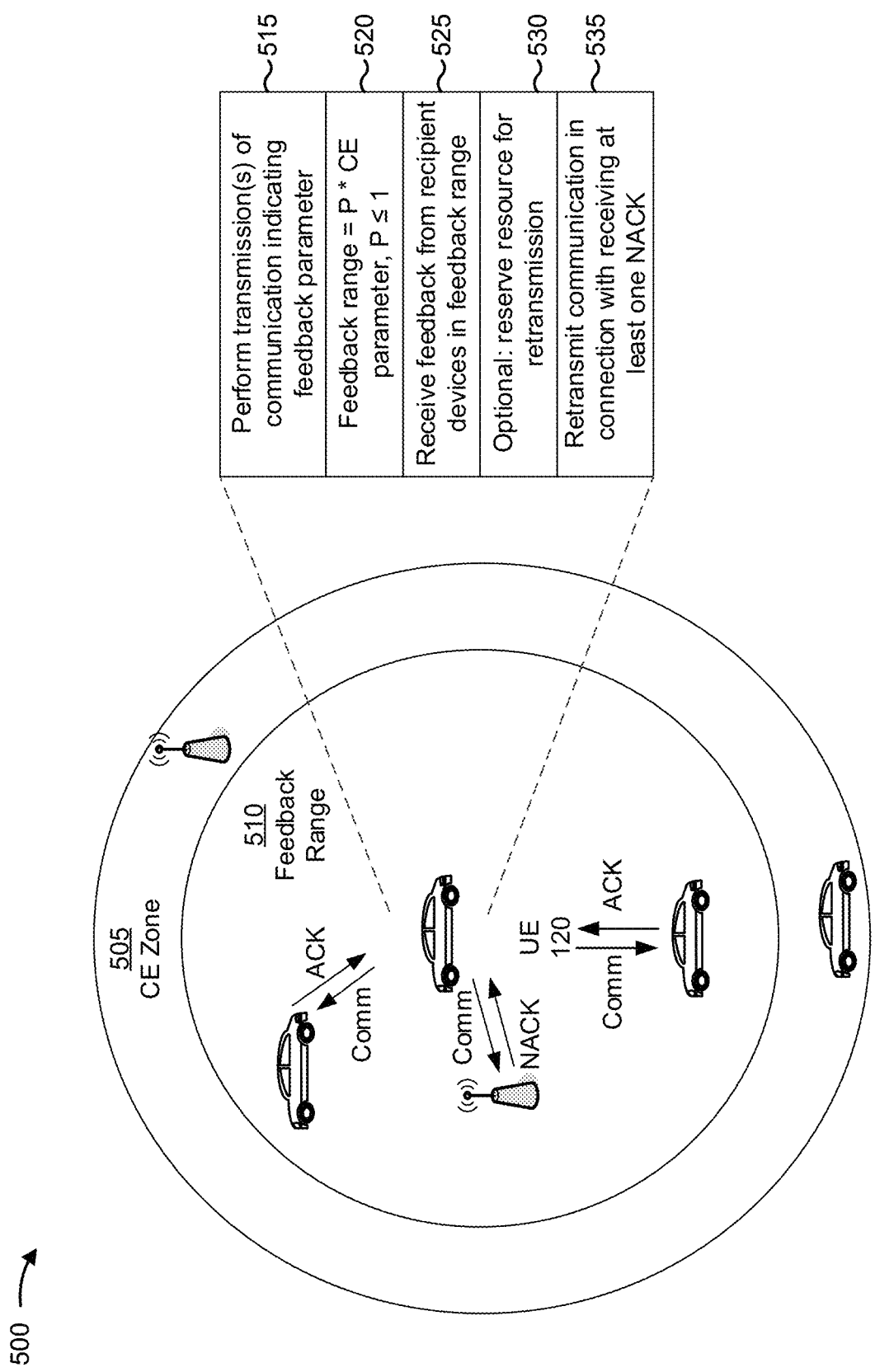
FIG. 5 is a diagram illustrating an example of feedback adaptation for V2X communication, in accordance with various aspects of the present disclosure.

FIG. 5 is a diagram illustrating an example 500 of feedback adaptation for V2X communication, in accordance with various aspects of the present disclosure. As shown, FIG. 5 includes a UE 120 and various recipient devices (shown as other UEs around the UE 120). In example 500, the UE 120 is a transmitter device.

As shown by reference number 505, the UE 120 is associated with a CE zone. Recipient devices within the CE zone may respect reservations made by the UE 120. For example, the UE 120 may indicate the CE zone to the recipient devices in association with a reservation for a certain resource. In some aspects, the CE zone may be based at least in part on a traffic type of a communication to be transmitted by the UE 120, a configuration of the UE 120, and/or the like. In some aspects, the CE zone may be variable (e.g., based at least in part on a packet delay budget, perceived network traffic of the UE 120, and/or other factors).

As shown by reference number 510, the UE 120 is associated with a feedback parameter. Recipient devices within a range defined by the feedback parameter may provide ACK/NACK feedback for a communication received from the UE 120. For example, a recipient device may provide ACK feedback or NACK feedback, only NACK feedback, only ACK feedback, and/or the like. The feedback parameter may be specific to a particular transmission, a traffic type, a location of the UE 120, an application that generated the communication, and/or the like, as described below. As shown, the feedback range defined by the feedback parameter is shorter than a range of the CE zone, as described in more detail in connection with reference number 520, below. In some aspects, the feedback parameter may define an RSRP range, as described elsewhere herein.

As shown by reference number 515, the UE 120 may perform one or more transmissions of a communication. The communication may include a data communication, a control communication, a reservation signal, and/or the like. As further shown, the communication may indicate the feedback parameter shown by reference number 510. As shown by reference number 520, the feedback parameter may be defined in relation to the CE zone. Here, the feedback parameter is P×(CE parameter), wherein the CE parameter defines a range of the CE zone in terms of distance. In some aspects, P is less than 1, since the feedback parameter is to be shorter than the range of the CE zone. In some aspects, P can be equal to 1 to permit the feedback parameter to match the range of the CE zone.

In some aspects, a value of P may be configurable (e.g., using radio resource control signaling, sidelink control information, information received from an application of the UE 120, and/or the like). In some aspects, a value of P may be based at least in part on a location of the UE 120. For example, the value of P may be different in an urban location than in a suburban or highway location. In some aspects, a value of P may be based at least in part on a path loss of the one or more communications, such as an expected path loss, an observed path loss, and/or the like. In some aspects, a value of P may be based at least in part on a receiver diversity gain of one or more receiver devices (e.g., from the receiver device having multiple receive (Rx) chains). In this case, P may be derived based at least in part on a minimum number of Rx chains (e.g., if some receiver devices have two Rx chains and other receiver devices have four Rx chains, P may be derived based at least in part on a two-Rx-chain assumption). Thus, the value of P may be determined in view of conditions associated with the UE 120 in addition to or as an alternative to the CE zone range, thereby improving efficiency of the UE 120 by reducing frivolous retransmission of the communication.

In some aspects, the feedback parameter may be based at least in part on a power level, such as a reference signal received power (RSRP) threshold. For example, when the CE zone is defined as a first RSRP threshold, the feedback parameter may be defined as a second RSRP threshold. This second RSRP threshold may be higher than the first RSRP threshold (since closer recipient devices are associated with a higher RSRP value). Thus, the relationship between feedback parameter and CE zone range, in terms of RSRP, may be defined as feedback parameter=Q*CE zone, where Q is greater than or equal to 1. Q may be determined based at least in part on one or more of the factors described in connection with P, above. In some aspects, the UE 120 may determine the feedback RSRP when location information (e.g., satellite navigation information, global navigation satellite system (GNSS) information, global positioning system (GPS) information, and/or the like) for the UE 120 is unavailable, and may use the distance-based approach to determining the feedback parameter when location information is available to the UE 120. Thus, versatility and reliability of the feedback parameter is improved by providing for the case when location information is unavailable to the UE 120. It should be noted that the feedback parameter can be defined as a distance, an RSRP value, or a combination thereof.

As shown by reference number 525, the UE 120 may receive feedback from recipient devices within the feedback parameter. Here, two recipient devices provide ACKs and one recipient device provides a NACK. In some aspects, recipient devices within the CE zone and outside of the feedback parameter may receive the communication and may not provide feedback regarding the communication (not shown in FIG. 5).

As shown by reference number 530, the UE 120 may optionally reserve a resource for one or more retransmissions of the communication. In some aspects, the UE 120 may perform this action before performing the first transmission or at the time of the first transmission.

As shown by reference number 535, the UE 120 may retransmit the communication in connection with (e.g., based at least in part on) receiving at least one NACK from a recipient device within the feedback parameter. Thus, the UE 120 improves feedback efficiency by using a feedback parameter that is based at least in part on the CE zone and that is configured to prevent recipient devices that are outside of the CE zone from being compelled to provide feedback, which reduces network congestion.

As indicated above, FIG. 5 is provided as an example. Other examples may differ from what is described with respect to FIG. 5.

Figure 6:
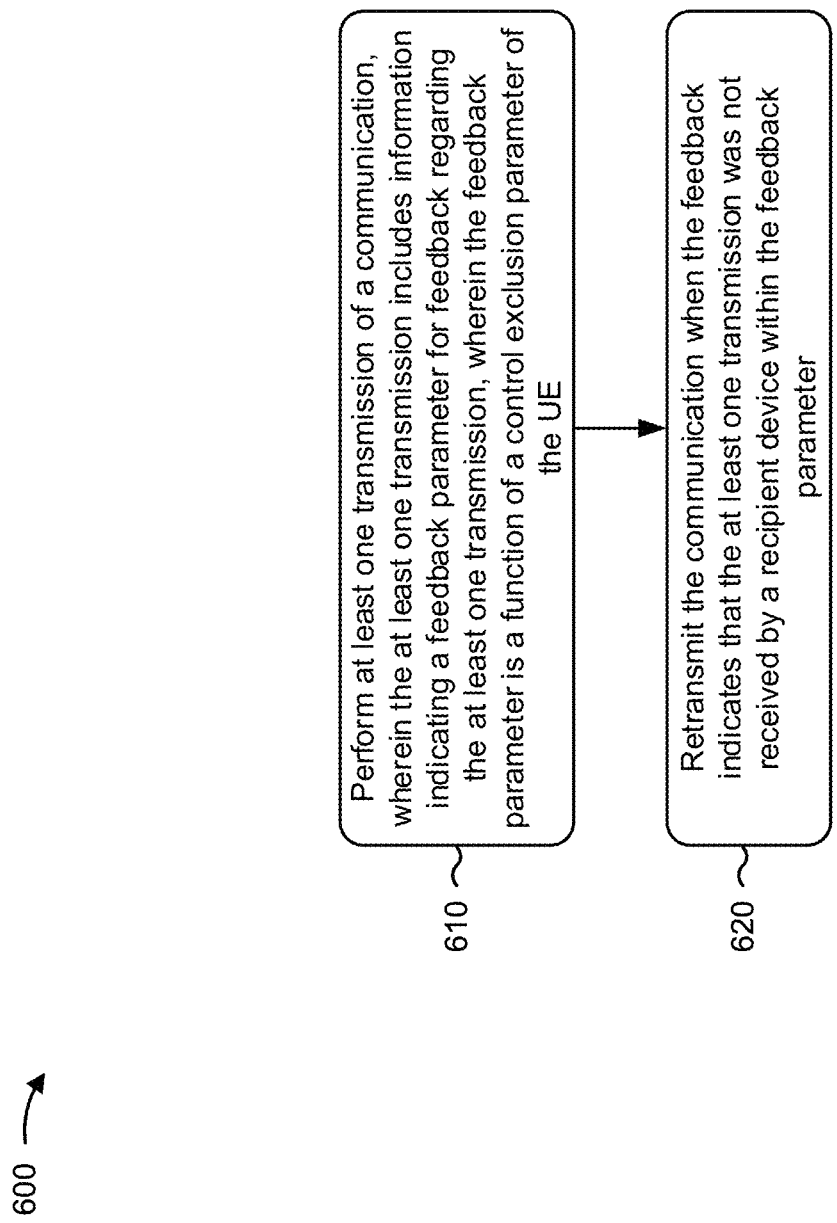
FIG. 6 is a diagram illustrating an example process performed, for example, by a user equipment, in accordance with various aspects of the present disclosure.

FIG. 6 is a diagram illustrating an example process 600 performed, for example, by a user equipment, in accordance with various aspects of the present disclosure. Example process 600 is an example where a UE (e.g., UE 120 and/or the like) performs operations associated with feedback adaptation for V2X communication.

As shown in FIG. 6, in some aspects, process 600 may include performing at least one transmission of a communication, wherein the at least one transmission includes information indicating a feedback parameter for feedback regarding the at least one transmission, wherein the feedback parameter is a function of a control exclusion parameter of the UE (block 610). For example, the UE (e.g., using controller/processor 280, transmit processor 264, TX MIMO processor 266, MOD 254, antenna 252, and/or the like) may perform at least one transmission of a communication, as described above. In some aspects, the at least one transmission includes information indicating a feedback parameter for feedback regarding the at least one transmission. In some aspects, the feedback parameter is a function of a control exclusion parameter of the UE.

As further shown in FIG. 6, in some aspects, process 600 may include retransmitting the communication when the feedback indicates that the at least one transmission was not received by a recipient device within the feedback parameter (block 620). For example, the UE (e.g., using controller/processor 280, transmit processor 264, TX MIMO processor 266, MOD 254, antenna 252, and/or the like) may retransmit the communication when the feedback indicates that the at least one transmission was not received by a recipient device within the feedback parameter, as described above.

Process 600 may include additional aspects, such as any single aspect or any combination of aspects described below and/or in connection with one or more other processes described elsewhere herein.

In a first aspect, retransmitting the communication based at least in part on the feedback is performed using a resource that is reserved before the communication is retransmitted.

In a second aspect, alone or in combination with the first aspect, the feedback parameter is based at least in part on a range requirement of the communication.

In a third aspect, alone or in combination with one or more of the first and second aspects, the feedback parameter is associated with a range that is smaller than or equal to a range associated with the control exclusion parameter.

In a fourth aspect, alone or in combination with one or more of the first through third aspects, the function is configurable by a network entity associated with the UE.

In a fifth aspect, alone or in combination with one or more of the first through fourth aspects, the feedback parameter is based at least in part on a first ratio when the feedback parameter is defined as a distance and a second ratio when the feedback parameter is defined as a reference signal received power (RSRP) value.

In a sixth aspect, alone or in combination with one or more of the first through fifth aspects, the feedback parameter is based at least in part on location information for the UE.

In a seventh aspect, alone or in combination with one or more of the first through sixth aspects, the feedback parameter is defined as a reference signal received power (RSRP) value.

In an eighth aspect, alone or in combination with one or more of the first through seventh aspects, the feedback parameter is defined as the RSRP value based at least in part on location information for the UE being unavailable to the UE.

In a ninth aspect, alone or in combination with one or more of the first through eighth aspects, the control exclusion parameter is an adapted control exclusion parameter of the UE.

In a tenth aspect, alone or in combination with one or more of the first through ninth aspects, the feedback parameter is a function of the adapted control exclusion parameter of the UE.

In an eleventh aspect, alone or in combination with one or more of the first through tenth aspects, the UE is associated with an adapted control exclusion parameter and the feedback parameter is a function of an un-adapted control exclusion parameter of the UE.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
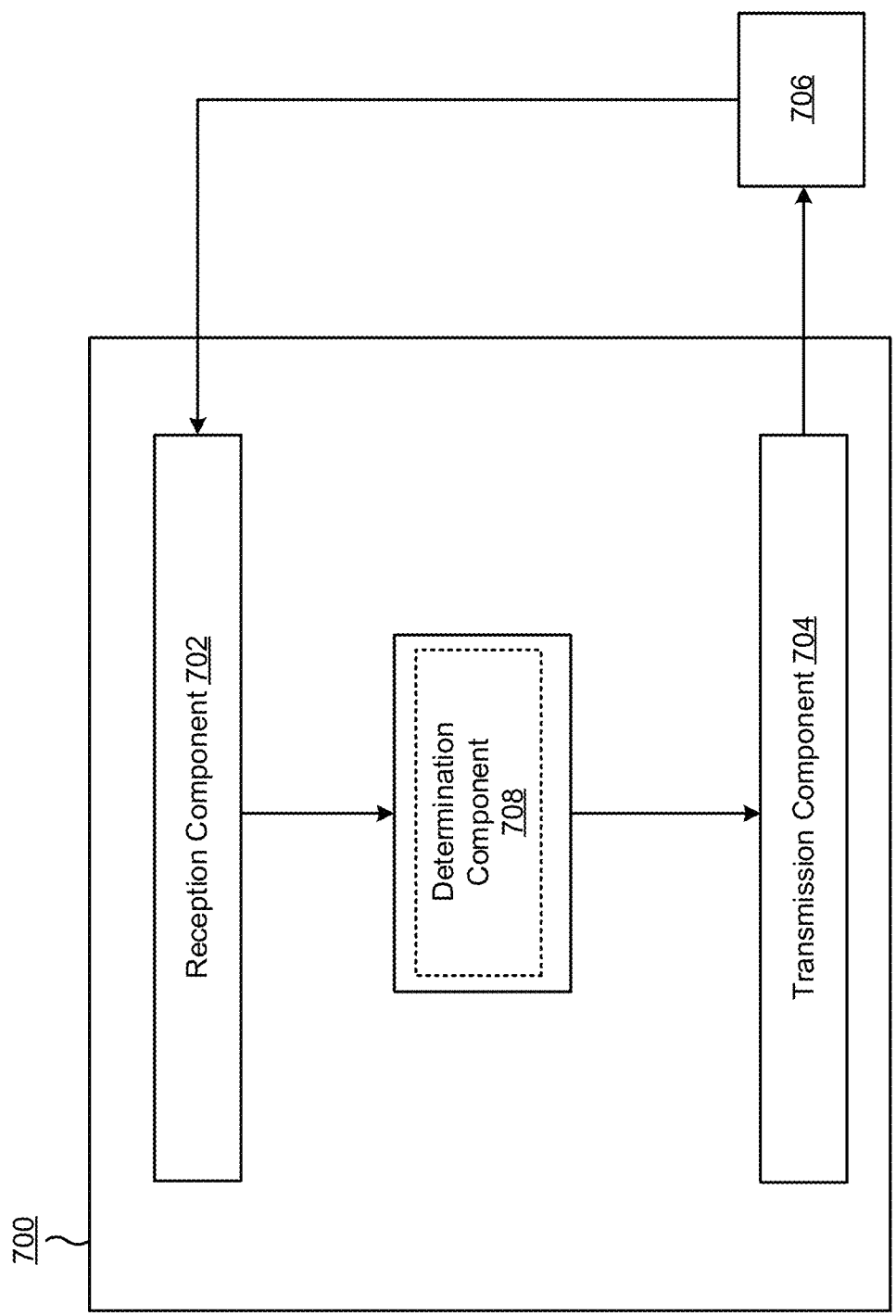
FIG. 7 is a block diagram of an example apparatus for wireless communication.

FIG. 7 is a block diagram of an example apparatus 700 for wireless communication. The apparatus 700 may be a UE, or a UE may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 706 may include a determination component 708.

In some aspects, the apparatus 700 may be configured to perform one or more operations described herein in connection with FIGS. 3-6. Additionally or alternatively, the apparatus 700 may be configured to perform one or more processes described herein, such as process 600 of FIG. 6. In some aspects, the apparatus 700 and/or one or more components shown in FIG. 7 may include one or more components of the UE described above in connection with FIG. 2. Additionally, or alternatively, one or more components shown in FIG. 7 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 706. In some aspects, the reception component 702 may include one or more antennas, a demodulator, a MIMO detector, a receive processor, a controller/processor, a memory, or a combination thereof, of the UE described above in connection with FIG. 2.

The transmission component 704 may transmit communications, such as reference signals, control information, data communications, or a combination thereof, to the apparatus 706. In some aspects, one or more other components of the apparatus 706 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modulator, a transmit MIMO processor, a transmit processor, a controller/processor, a memory, or a combination thereof, of the UE described above in connection with FIG. 2. In some aspects, the transmission component 704 may be collocated with the reception component 702 in a transceiver.

The transmission component 704 may perform at least one transmission of a communication, wherein the at least one transmission includes information indicating a feedback parameter for feedback regarding the at least one transmission, wherein the feedback parameter is a function of a control exclusion parameter of the apparatus 700. In some aspects, the transmission component 704 may retransmit the communication when the feedback indicates that the at least one transmission was not received by a recipient device within the feedback parameter. The determination component 708 may determine the feedback parameter, for example, as a function of a control exclusion parameter of the apparatus 700.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally or alternatively, a set of (one or more) components shown in FIG. 7 may perform one or more functions described as being performed by another set of components shown in FIG. 7.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more."

Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
    performing at least one transmission of a communication including information indicating a feedback parameter for feedback regarding the at least one transmission,
        wherein the feedback parameter is a function of a control exclusion parameter, of the UE, associated with a range of a control exclusion zone associated with respecting a reservation of a resource by another UE,
        wherein the feedback parameter is shorter than or equal to the control exclusion parameter, and
        wherein the feedback parameter is based at least in part on a power level when location information for the UE is unavailable to the UE, or wherein the feedback parameter is based at least in part on the location information for the UE when the location information for the UE is available to the UE;
    receiving, from a recipient device within a range associated with the feedback parameter, feedback indicating that the transmission was not received; and
    retransmitting, based at least in part on the feedback, the communication.

2. The method of claim 1, wherein the feedback parameter is based at least in part on the power level when the location information, for the UE, is unavailable to the UE.

3. The method of claim 2, wherein the power level is a reference signal received power (RSRP) value.

4. The method of claim 1, wherein the communication is retransmitted using another resource that is reserved for retransmitting the communication before the communication is retransmitted.

5. The method of claim 1, wherein the range associated with the feedback parameter is associated with a range requirement of the communication, and wherein the feedback parameter is based at least in part on the range requirement of the communication.

6. The method of claim 1, wherein the range associated with the feedback parameter is smaller than or equal to the range of the control exclusion parameter.

7. The method of claim 1, wherein the function is configurable by a network entity associated with the UE.

8. The method of claim 1, wherein the feedback parameter is based at least in part on the location information for the UE when the location information for the UE is available to the UE.

9. The method of claim 1, wherein the control exclusion parameter is an adapted control exclusion parameter of the UE.

10. The method of claim 9, wherein the feedback parameter is a function of the adapted control exclusion parameter of the UE.

11. The method of claim 1, wherein the UE is associated with an adapted control exclusion parameter, and wherein the feedback parameter is a function of an un-adapted control exclusion parameter of the UE.

12. The method of claim 1, wherein the control exclusion zone is based at least in part on at least one of a traffic type of the communication or a configuration of the UE.

13. The method of claim 1, wherein the feedback parameter is function of the control exclusion parameter and another parameter.

14. A user equipment (UE) for wireless communication, comprising:
one or more memories; and
one or more processors coupled to the one or more memories, the one or more processors configured to:
perform at least one transmission of a communication including information indicating a feedback parameter for feedback regarding the at least one transmission,
wherein the feedback parameter is a function of a control exclusion parameter, of the UE, associated with a range of a control exclusion zone associated with respecting a reservation of a resource by another UE,
wherein the feedback parameter is shorter than or equal to the control exclusion parameter, and
wherein the feedback parameter is based at least in part on a power level when location information for the UE is unavailable, or wherein the feedback parameter is based at least in part on the location information for the UE when the location information for the UE is available;
receive, from a recipient device within a range associated with the feedback parameter, feedback indicating that the transmission was not received; and
retransmit, based at least in part on the feedback, the communication.

15. The UE of claim 14, wherein the feedback parameter is based at least in part on the power level when the location information for the UE being unavailable to the UE.

16. The UE of claim 15, wherein the power level is a reference signal received power (RSRP) value.

17. The UE of claim 14, wherein the communication is retransmitted using another resource that is reserved for retransmitting the communication before the communication is retransmitted.

18. The UE of claim 14, wherein the range associated with the feedback parameter is associated with a range requirement of the communication, and wherein the feedback parameter is based at least in part on the range requirement of the communication.

19. The UE of claim 14, wherein the range associated with the feedback parameter is smaller than or equal to the range of the control exclusion parameter.

20. The UE of claim 14, wherein the feedback parameter is based at least in part on the location information for the UE when the location information for the UE is available to the UE.

21. The UE of claim 14, wherein the control exclusion parameter is an adapted control exclusion parameter of the UE.

22. The UE of claim 21, wherein the feedback parameter is a function of the adapted control exclusion parameter of the UE.

23. The UE of claim 14, wherein the UE is associated with an adapted control exclusion parameter, and wherein the feedback parameter is a function of an un-adapted control exclusion parameter of the UE.

24. The UE of claim 14, wherein the feedback parameter is function of the control exclusion parameter and another parameter.

25. A non-transitory computer-readable medium storing one or more instructions for wireless communication, the one or more instructions comprising:
one or more instructions that, when executed by one or more processors of a user equipment (UE), cause the one or more processors to:
perform at least one transmission of a communication including information indicating a feedback parameter for feedback regarding the at least one transmission,
wherein the feedback parameter is a function of a control exclusion parameter, of the UE, associated with a range of a control exclusion zone associated with respecting a reservation of a resource by another UE,
wherein the feedback parameter is shorter than or equal to the control exclusion parameter, and
wherein the feedback parameter is based at least in part on a power level when location information for the UE is unavailable, or wherein the feedback parameter is based at least in part on the location information for the UE when the location information for the UE is available;
receive, from a recipient device within a range associated with the feedback parameter, feedback indicating that the transmission was not received; and
retransmit, based at least in part on the feedback, the communication.

26. The non-transitory computer-readable medium of claim 25, wherein the communication is retransmitted using another resource that is reserved for retransmitting the communication before the communication is retransmitted.

27. The non-transitory computer-readable medium of claim 25, wherein the feedback parameter is based at least in part on the power level when the location information for the UE is unavailable to the UE.

28. The non-transitory computer-readable medium of claim 25, wherein the feedback parameter is function of the control exclusion parameter and another parameter.

29. An apparatus for wireless communication, comprising:
means for performing at least one transmission of a communication including information indicating a feedback parameter for feedback regarding the at least one transmission,
wherein the feedback parameter is a function of a control exclusion parameter, of the apparatus, associated with a range of a control exclusion zone associated with respecting a reservation of a resource by another UE,
wherein the feedback parameter is shorter than or equal to the control exclusion parameter, and
wherein the feedback parameter is based at least in part on a power level when location information for the UE is unavailable, or wherein the feedback parameter is based at least in part on the location information for the UE when the location information for the UE is available;
means for receiving, from a recipient device within a range associated with the feedback parameter, feedback indicating that the transmission was not received; and
means for retransmitting, based at least in part on receiving the feedback from a recipient device, the communication when the feedback indicates that the at least one transmission was not received by the recipient device within the feedback parameter.

30. The apparatus of claim 29, wherein the feedback parameter is defined as a reference signal received power (RSRP) value.

* * * * *